(12) United States Patent
Warren

(10) Patent No.: US 11,134,672 B1
(45) Date of Patent: Oct. 5, 2021

(54) BUG REPELLENT SYSTEM

(71) Applicant: Ronald D. Warren, Arlington, TX (US)

(72) Inventor: Ronald D. Warren, Arlington, TX (US)

( * ) Notice: Subject to any disclaimer, the term of this patent is extended or adjusted under 35 U.S.C. 154(b) by 356 days.

(21) Appl. No.: 16/357,545

(22) Filed: Mar. 19, 2019

(51) Int. Cl.
*A01M 29/12* (2011.01)
*A45F 5/02* (2006.01)
*H05B 1/02* (2006.01)
*H02J 7/35* (2006.01)
*H02J 7/00* (2006.01)

(52) U.S. Cl.
CPC .............. *A01M 29/12* (2013.01); *A45F 5/021* (2013.01); *H02J 7/00* (2013.01); *H02J 7/35* (2013.01); *H05B 1/0291* (2013.01); *A45F 2200/05* (2013.01)

(58) Field of Classification Search
CPC ... A01M 29/12; H02J 7/00; H02J 7/35; A45F 5/021; A45F 2200/05; H05B 1/0291
See application file for complete search history.

(56) References Cited

U.S. PATENT DOCUMENTS

| | | |
|---|---|---|
| D383,827 S | 9/1997 | Barbone |
| 6,033,212 A | 3/2000 | Bonnema |
| D491,247 S | 6/2004 | Chuang |
| 7,167,641 B2 * | 1/2007 | Tam ..................... A01M 1/2072 392/405 |
| 7,835,631 B2 | 11/2010 | Wang |
| 9,352,062 B2 * | 5/2016 | Klemm ................... A61L 9/122 |
| 2002/0005437 A1 * | 1/2002 | Ketcha .................. A01M 29/12 239/13 |
| 2004/0128904 A1 | 7/2004 | Chen |
| 2006/0260183 A1 * | 11/2006 | Hockaday ............. A01M 1/023 43/129 |
| 2007/0183940 A1 * | 8/2007 | Yamamoto .......... A01M 1/2033 422/124 |
| 2009/0031612 A1 | 2/2009 | Hubbard |
| 2010/0229459 A1 | 9/2010 | Simchoni-Barak |
| 2014/0165452 A1 | 6/2014 | Rocha |

FOREIGN PATENT DOCUMENTS

WO 2009136951 11/2009

* cited by examiner

*Primary Examiner* — Michael C Zarroli
(74) *Attorney, Agent, or Firm* — Kyle A. Fletcher, Esq.

(57) ABSTRACT

The bug repellent system is configured for use in repelling insects. The bug repellent system is an electrically powered device. The bug repellent sublimates an essential oil contained within a cartridge. The cartridge is a solid phase of a solution comprising the essential oil dissolved in a paraffin solvent. The selected essential oil is an insect repellent known to repel mosquitos. The bug repellent system is worn by a client. The bug repellent system comprises a housing, the cartridge, and a sublimating device. The housing contains the cartridge and the sublimating device. The sublimating device warms the cartridge such that the essential oil sublimates into the atmosphere from the cartridge. The housing is worn by the client.

18 Claims, 4 Drawing Sheets

BUG REPELLENT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture and scaring unwanted animals, more specifically, a method for narcotizing insects using electrical resistance as a heat source. (A01M1/2077)

SUMMARY OF INVENTION

The bug repellent system is configured for use in repelling insects. The bug repellent system is an electrically powered device. The bug repellent sublimates an essential oil contained within a cartridge. The cartridge is a solid phase of a solution comprising the essential oil dissolved in a paraffin solvent. The selected essential oil is an insect repellent known to repel mosquitos. The bug repellent system is worn by a client. The bug repellent system comprises a housing, the cartridge, and a sublimating device. The housing contains the cartridge and the sublimating device. The sublimating device warms the cartridge such that the essential oil sublimates into the atmosphere from the cartridge. The housing is worn by the client.

These together with additional objects, features and advantages of the bug repellent system will be readily apparent to those of ordinary skill in the art upon reading the following detailed description of the presently preferred, but nonetheless illustrative, embodiments when taken in conjunction with the accompanying drawings.

In this respect, before explaining the current embodiments of the bug repellent system in detail, it is to be understood that the bug repellent system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bug repellent system.

It is therefore important that the claims be regarded as including such equivalent construction insofar as they do not depart from the spirit and scope of the bug repellent system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
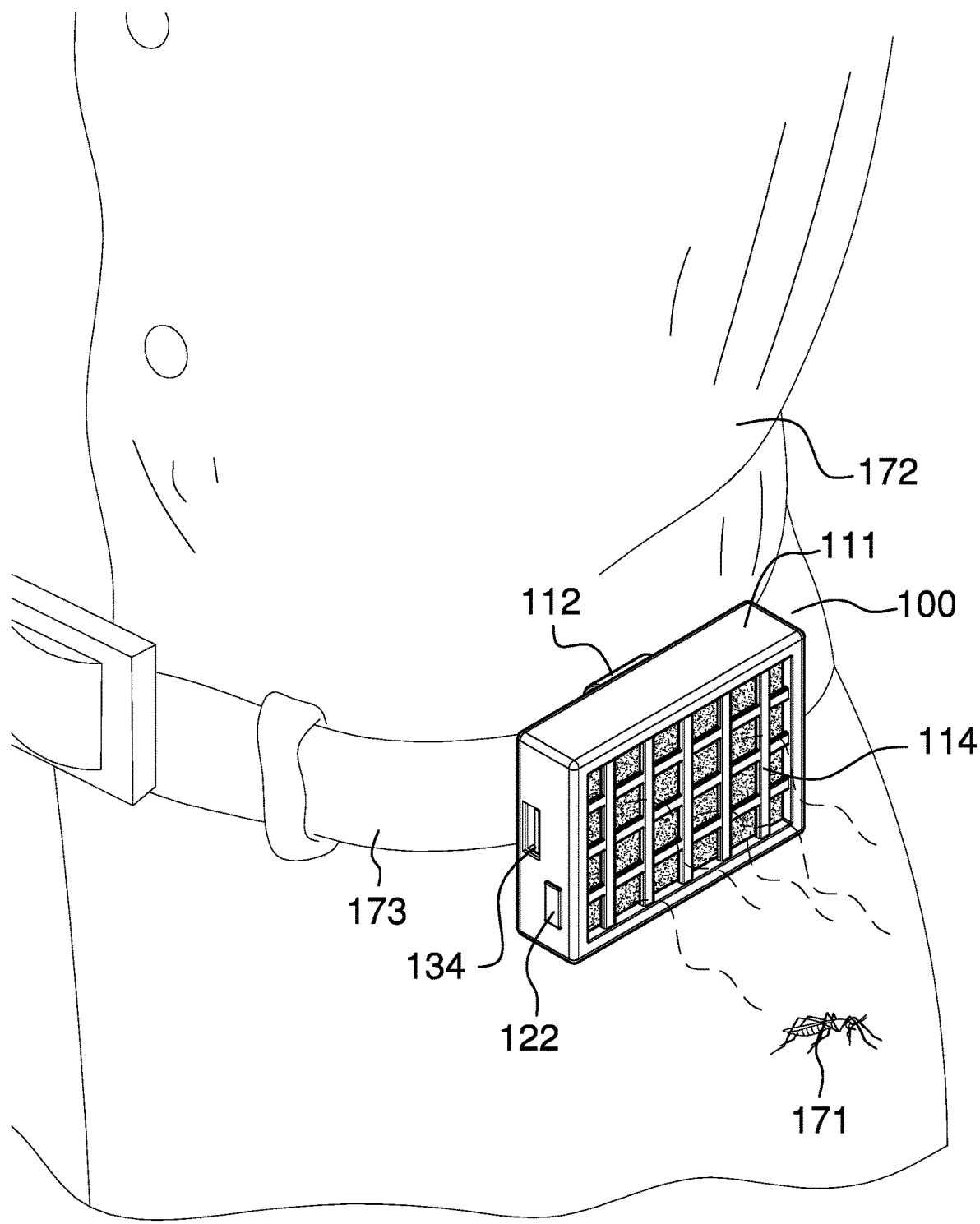
FIG. 1 is an in-use view of an embodiment of the disclosure.
Figure 2:
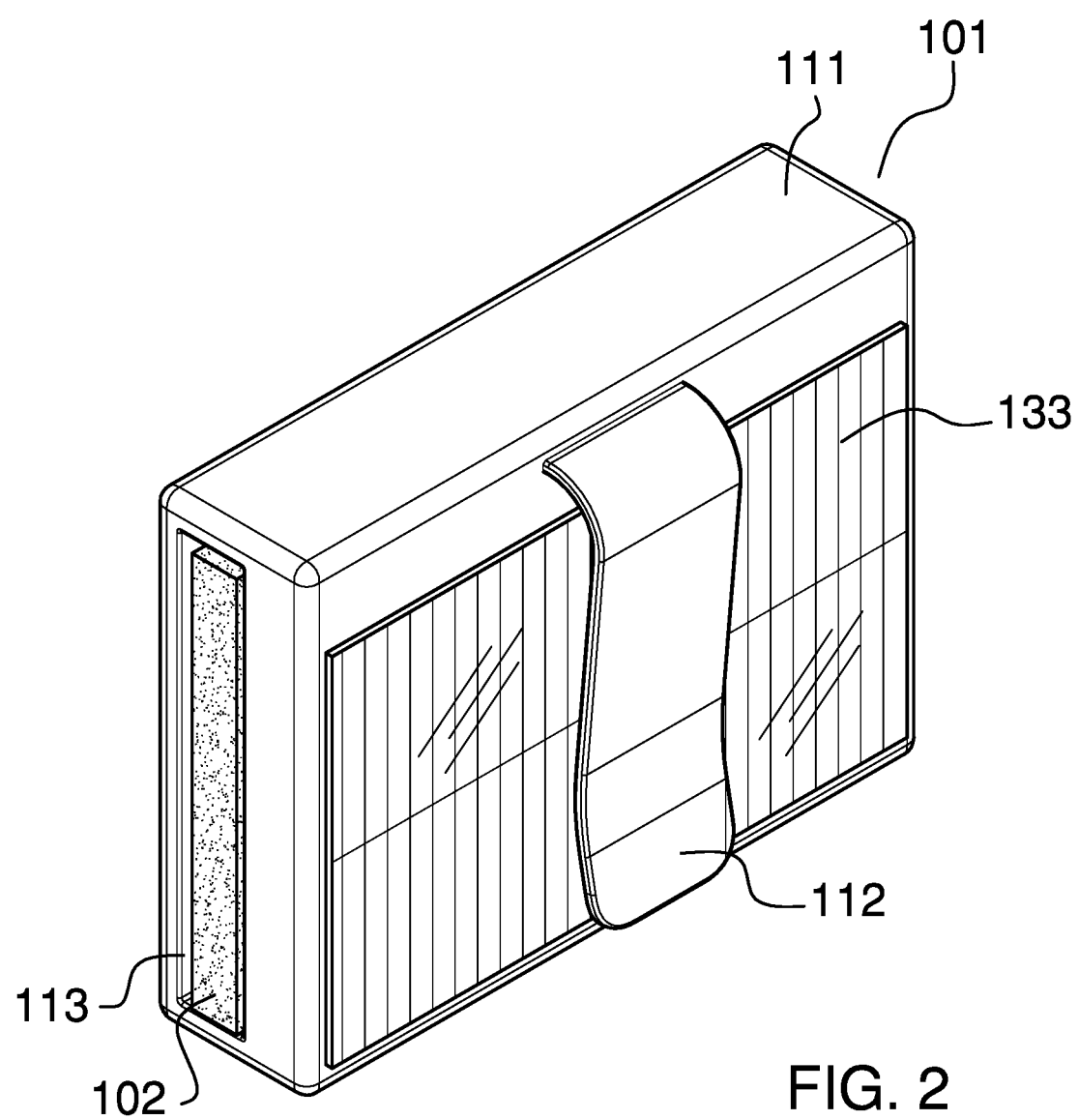
FIG. 2 is a perspective view of an embodiment of the disclosure.
Figure 3:
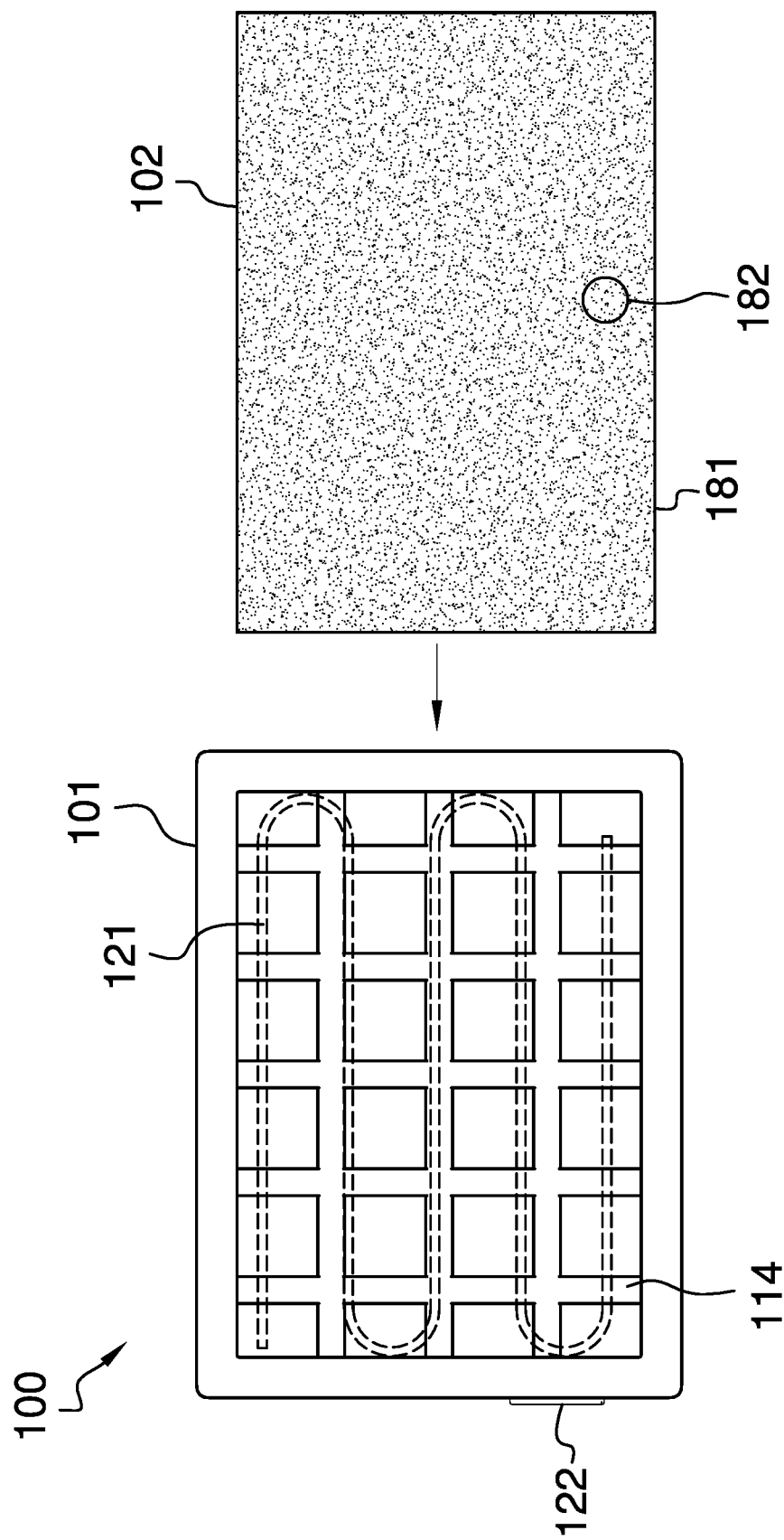
FIG. 3 is a front view of an embodiment of the disclosure.
Figure 4:
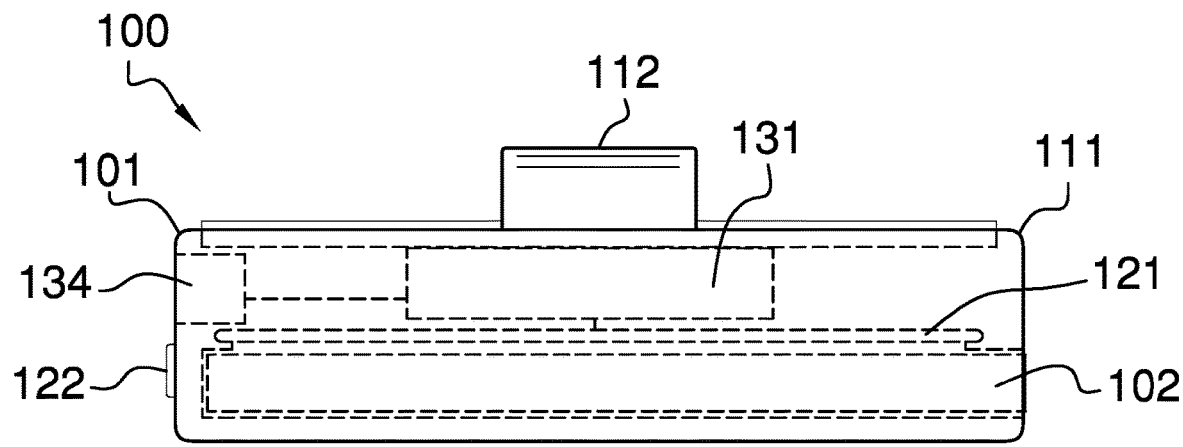
FIG. 4 is a top view of an embodiment of the disclosure.
Figure 5:
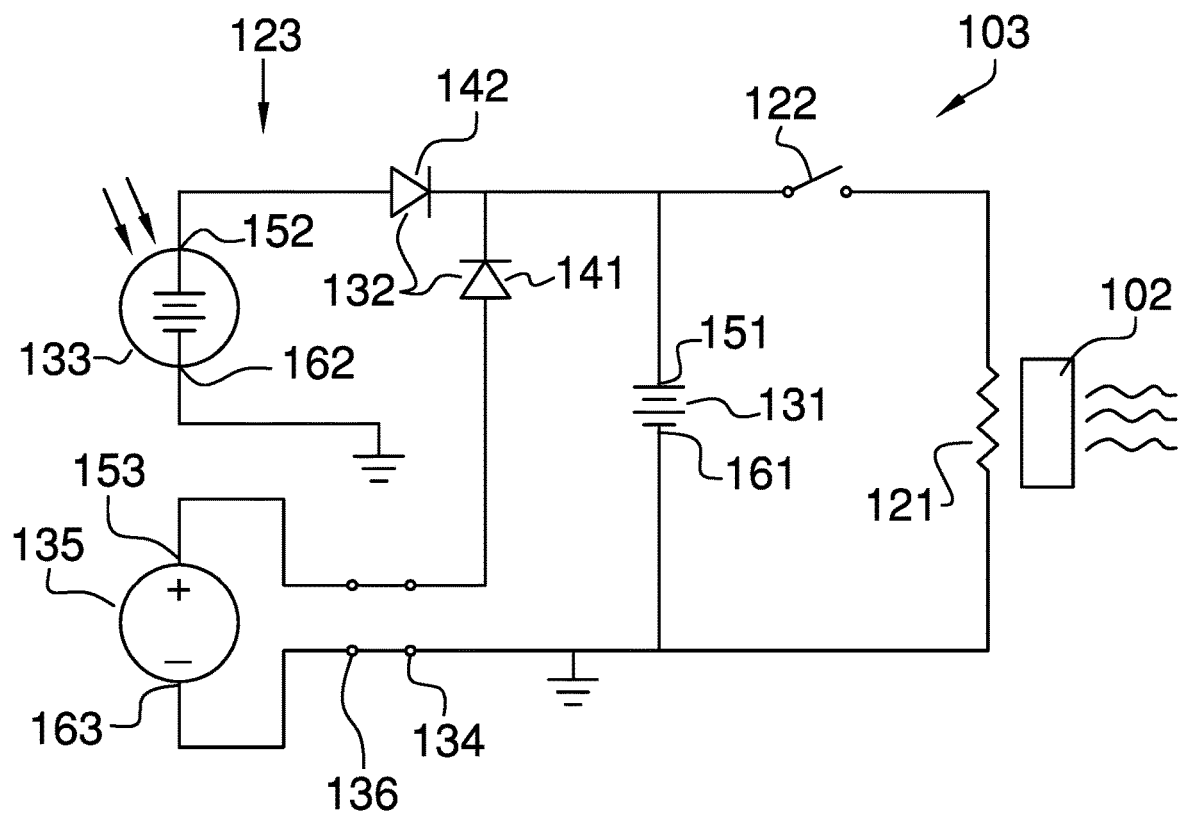
FIG. 5 is a block diagram of an embodiment of the disclosure.

Detailed reference will now be made to one or more potential embodiments of the disclosure, which are illustrated in FIGS. 1 through 5.

The bug repellent system 100 (hereinafter invention) is configured for use in repelling insects including mosquitos 171. The invention 100 is an electrically powered device. The invention 100 sublimates an essential oil 182 contained within a cartridge 102. The cartridge 102 is a solid phase of a solution comprising the essential oil 182 dissolved in a paraffin 181 solvent. The selected essential oil 182 is an insect repellent known to repel mosquitos 171. The invention 100 is worn by a client 172. The invention 100 comprises a housing 101, the cartridge 102, and a sublimating device 103. The housing 101 contains the cartridge 102 and the sublimating device 103. The sublimating device 103 warms the cartridge 102 such that the essential oil 182 sublimates into the atmosphere from the cartridge 102. The housing 101 is worn by the client 172.

The housing 101 is a casing. The housing 101 contains the cartridge 102 and the sublimating device 103. The housing 101 is formed with all apertures and form factors necessary to allow the housing 101 to accommodate the use and operation of the cartridge 102 and the sublimating device 103. Methods to form a housing 101 suitable for the purposes described in this disclosure are well-known and documented in the mechanical arts. The housing 101 comprises a shell 111, a clip 112, a cartridge slot 113, and a grille 114.

The shell 111 forms the exterior surfaces of the housing 101. The shell 111 is a rectangular block structure. The clip 112, the cartridge slot 113, and the grille 114 are formed in the shell 111. The shell 111 contains the cartridge 102 and the sublimating device 103. The shell 111 is formed with all apertures and form factors necessary to allow the shell 111 to accommodate the use and operation of the cartridge 102 and the sublimating device 103. Methods to form a shell 111 suitable for the purposes described in this disclosure are well-known and documented in the mechanical arts.

The clip 112 is a fastening device. The clip 112 is a curved plate structure that attaches to the shell 111 in the manner of a cantilever. The clip 112 attaches to the shell 111 such that the shell 111 and the clip 112 forms a spring structure similar to a cantilever V spring. The clip 112 attaches the invention 100 to the belt 173 of the client 172. The belt 173 is an item of clothing worn by the client 172.

The cartridge slot 113 is a negative space that is formed in the shell 111. The cartridge slot 113 is sized to receive the cartridge 102. The cartridge slot 113 contains the cartridge 102 in the shell 111. The cartridge slot 113 forms an aperture through the shell 111 such that the cartridge 102 can insert into and be removed from the shell 111. The cartridge slot 113 is positioned proximal to the sublimating device 103 such that the sublimating device 103 can heat the cartridge 102 contained within the sublimating device 103.

The grille 114 is an openwork structure. The grille 114 holds the solid phase of the cartridge 102 within the cartridge slot 113 while allowing the release of the sublimated pharmacologically active media into the atmosphere.

The cartridge 102 is a chemical device. The cartridge 102 is a solid phase structure. The cartridge 102 sublimates a pharmacologically active media into the atmosphere. The pharmacologically active media sublimated by the cartridge 102 acts as an insect repellent. The cartridge 102 is stored within the housing 101. The cartridge 102 comprises a paraffin 181 and an essential oil 182.

The essential oil 182 is the pharmacologically active media. The essential oil 182 is a lipid-based chemical structure that is dissolved into the paraffin 181. The essential oil 182 is selected to repel mosquitos 171 away from the client 172. In the first potential embodiment of the disclosure, the essential oil 182 is selected from the group consisting of citronella oil, peppermint oil, lemon oil, *eucalyptus* oil, basil oil, clove oil, thyme oil, lemongrass oil, geranium oil, and lavender oil.

The paraffin 181 is a lipid-based chemical structure that is solid at normal temperature and pressure. The paraffin 181 forms a solvent within which the essential oil 182 dissolves. The essential oil 182 is dissolved in the paraffin 181 while the paraffin 181 is in a liquid phase and then the solution of the essential oil 182 in the paraffin 181 is cooled such that the paraffin 181 solidifies to form the cartridge 102 in a solid phase.

The lower vapor pressure of the essential oil 182 relative to the paraffin 181 allows the essential oil 182 to sublimate from the cartridge 102 while the paraffin 181 remains in the solid phase The sublimating device 103 is an electrically powered heating device. The sublimating device 103 heats the cartridge 102 to accelerate the sublimation of the pharmacologically active media. The sublimating device 103 comprises a heating element 121, a master switch 122, and a power system 123.

The heating element 121 is an electrical device. The heating element 121 is a resistive heating device. The heating element 121 is proximal to the cartridge 102 such that the heat generated by the heating element 121 will accelerate the sublimation of the pharmacologically active media into the atmosphere. The use of heating element 121 is well-known and documented in the electrical arts.

The master switch 122 is an electrical switch. The master switch 122 controls the flow of electricity from the power system 123 into the heating element 121. The master switch 122 acts as the power switch for the invention 100. The use of a switch to perform the functions of the master switch 122 is well-known and documented in the electrical arts.

The power system 123 is an electrochemical device. The power system 123 converts energy stored as chemical potential energy into electrical energy. The power system 123 provides the electrical energy required to operate the heating element 121. The power system 123 is a regenerative system. By regenerative is meant that the process that converts the chemical potential energy into electricity is reversible in a manner that restores the chemical potential energy consumed by the heating element 121.

The power system 123 comprises a battery 131, a plurality of diodes 132, a photovoltaic cell 133, a charging port 134, and an external power source 135. The external power source 135 further comprises a charging plug 136. The battery 131 is further defined with a first positive terminal 151 and a first negative terminal 161. The photovoltaic cell 133 is further defined with a second positive terminal 152 and a second negative terminal 162. The external power source 135 is further defined with a third positive terminal 153 and a third negative terminal 163.

Each of the plurality of diodes 132 is an electrical device that limits the flow of electrical energy to a single direction. The plurality of diodes 132 control the flow of electrical energy through the sublimating device 103. The plurality of diodes 132 comprises a first diode 141 and a second diode 142.

The battery 131 is a commercially available rechargeable battery 131. The chemical energy stored within the rechargeable battery 131 is renewed and restored through the use of the charging port 134. The charging port 134 is an electrical circuit that reverses the polarity of the rechargeable battery 131 and provides the energy necessary to reverse the chemical processes that the rechargeable battery 131 initially used to generate the electrical energy. This reversal of the chemical process creates a chemical potential energy that will later be used by the rechargeable battery 131 to generate electricity.

The charging port 134 attaches to an external power source 135 using the charging plug 136. The charging port 134 receives electrical energy from the external power source 135 through the charging plug 136. The first diode 141 is an electrical device that allows current to flow in only one direction. In the first potential embodiment of the disclosure, the external power source 135 and the charging port 134 are compatible with USB power requirements.

The first diode 141 installs between the rechargeable battery 131 and the charging port 134 such that electricity will not flow from the first positive terminal 151 of the rechargeable battery 131 into the second positive terminal 152 of the external power source 135. The first diode 141 further installs between the photovoltaic cell 133 and the charging port 134 such that electricity will not flow from the second positive terminal 152 of the photovoltaic cell 133 into the third positive terminal 153 of the external power source 135.

The chemical energy stored within the rechargeable battery 131 is further renewed and restored through the use of the photovoltaic cell 133. The photovoltaic cell 133 reverses the polarity of the rechargeable battery 131 and provides the energy necessary to reverse the chemical processes that the rechargeable battery 131 initially used to generate the electrical energy. This reversal of the chemical process creates a chemical potential energy that will later be used by the rechargeable battery 131 to generate electricity.

The photovoltaic cell 133 is a photoelectric device that converts light into electric energy. The second diode 142 is an electrical device that allows current to flow in only one direction. The second diode 142 installs between the rechargeable battery 131 and the charging port 134 such that electricity will not flow from the first positive terminal 151 of the rechargeable battery 131 into the second positive terminal 152 of the photovoltaic cell 133. The second diode 142 further installs between the photovoltaic cell 133 and the charging port 134 such that electricity will not flow from the third positive terminal 153 of the external power source 135 into the second positive terminal 152 of the photovoltaic cell 133.

The following definitions were used in this disclosure:

Atmosphere: As used in this disclosure, the atmosphere refers to a blanket of gases (primarily nitrogen and oxygen) that surround the earth. Typical atmospheric conditions are approximated and characterized as the normal temperature and pressure.

Battery: As used in this disclosure, a battery is a chemical device consisting of one or more cells, in which chemical energy is converted into electricity and used as a source of power. Batteries are commonly defined with a positive terminal and a negative terminal.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cantilever V Spring: As used in this disclosure, a cantilever V spring is a torsion spring that is formed in a chevron, hyoid or horseshoe shape. The cantilever V spring comprises a first cantilever structure and a second cantilever structure wherein the fixed end of the first cantilever structure is attached to the fixed end of the second cantilever structure. Within this structure, when a force is applied to the cantilever V spring such that the first cantilever structure moves relative to from the second cantilever structure the force deforms the cantilever V spring in an elastic manner that: 1) resists the application of the force; and 2) stores the energy deformation such that when the force is no longer applied the cantilever V spring returns to its relaxed shape. Depending on the application, a cantilever V spring can be considered a torsion spring, a tension spring, or a compression spring. Cartridge: As used in this disclosure, a cartridge is a device used to contain an object or material in a manner suitable for use by a mechanical device. A cartridge will removably insert into the mechanical device such that the mechanical device can use the object or material as part of the process performed by the mechanical device. The cartridge is removed from the mechanical device once the object or material has been consumed.

Clip: As used in this disclosure, a clip is a fastener that attaches to an object by gripping or clasping the object.

Diode: As used in this disclosure, a diode is a two terminal semiconductor device that allows current flow in only one direction. The two terminals are called the anode and the cathode. Electric current is allowed to pass from the anode to the cathode.

Essential Oil: As used in this disclosure, an essential oil is a lipid-based solution that contains one or more volatile aroma compounds. Examples of essential oils include, but are not limited to, basil oil, black pepper oil, caraway oil, *cannabis* flower oil, cedar wood oil, cinnamon oil, citronella oil, chamomile oil, clove oil, davana oil, *eucalyptus* oil, frankincense oil, horseradish oil, jasmine oil, lavender oil, lemon oil, lemongrass oil, mandarin oil, nutmeg oil, orange oil, oregano oil, peppermint oil, pine oil, sage oil, sandalwood oil, star anise oil, and thyme oil. Basil oil, cedar wood oil, citronella oil, chamomile oil, clove oil, lavender oil, lemongrass oil, and peppermint oil are traditionally considered to have insect repellent properties.

External Power Source: As used in this disclosure, an external power source is a source of the energy that is externally provided to enable the operation of the present disclosure. Examples of external power sources include, but are not limited to, electrical power sources and compressed air sources.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Grille: As used in this disclosure, a grille is a cover for a vent of an HVAC system. The grille comprises a barrier formed of bars or wires that allow for the passage of gas through the grille while preventing solid items from passing through the grille.

Heating Element: As used in this disclosure, a heating element is a resistive wire that is used to convert electrical energy into heat. Common metal combinations used to form heat elements include a combination of nickel and Chromium (typical: 80/20), a combination of iron, chromium and aluminum (typical 70/25/5), a combination of copper, nickel, iron, and manganese (typical 66/30/2/2) (use for continuously hot), or platinum.

Housing: As used in this disclosure, a housing is a rigid casing that encloses and protects one or more devices.

Insect Repellent: As used in this disclosure, an insect repellant is an essential oil wherein the volatile aroma compounds contain an aroma intended to discourage insects from landing on a surface or remaining in an area.

Lipid: As used in this disclosure, a lipid is an organic molecule that is soluble in nonpolar solvents.

Liquid: As used in this disclosure, a liquid refers to a state (phase) of matter that is fluid and that maintains, for a given pressure, a fixed volume that is independent of the volume of the container.

Maintained Switch: A used in this disclosure, a maintained switch is a switch that maintains the position that was set in the most recent switch actuation. A maintained switch works in an opposite manner to a momentary switch.

Negative Space: As used in this disclosure, negative space is a method of defining an object through the use of open or empty space as the definition of the object itself, or, through the use of open or empty space to describe the boundaries of an object.

Normal Temperature and Pressure: As used in this disclosure, normal temperature and pressure refers to atmospheric conditions corresponding to 20 degrees C. at 100 kPa (approx. 1 atmosphere). Normal temperature and pressure is often abbreviated as NTP. See standard temperature and pressure.

Openwork: As used in this disclosure, the term open work is used to describe a structure, often a surface, which is formed with openings that allow for visibility and fluid flow through the structure. Wrought work and meshes are forms of openwork.

Paraffin: As used in this disclosure, paraffin is an organic molecule: 1) with a carbon base chain of greater than 20 atoms or carbon and oxygen base chain of greater than 20 carbon or oxygen atoms; and, 2) that is solid at room temperature. While it is explicitly recognized that technically a paraffin is an alkane, this disclosure purposely broadens the scope of the term to more closely match the common uses of the term paraffin. For the purposes of this disclosure, a paraffin can potentially further comprise carbon-carbon double bonds and functional groups including, but not limited to, aldehydes, esters, hydroxyls, and ketones.

Pharmacologically Active Media: As used in this disclosure, a pharmacologically active media refers to a chemical substance that has a biochemical or physiological effect on a biological organism.

Phase: As used in this disclosure, phase refers to the state of the form of matter. The common states of matter are solid, liquid, gas, and plasma.

Photovoltaic Cell: As used in this disclosure, a photovoltaic cell is an electrical device that directly converts light energy into electrical energy.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Rectangular Block: As used in this disclosure, a rectangular block refers to a three-dimensional structure comprising six rectangular surfaces (commonly called faces) formed at right angles. Within this disclosure, a rectangular block may further comprise rounded edges and corners.

Repellent: As used in this disclosure, a repellent is a chemical substance that is used to repel animals away from an object or location.

Rounded: A used in this disclosure, the term rounded refers to the replacement of an apex, vertex, or edge or brink of a structure with a (generally smooth) curvature wherein the concave portion of the curvature faces the interior or center of the structure.

Rounded Rectangle: A used in this disclosure, a rounded rectangle is a rectangle wherein one or more of the corner structures of the rectangle are replaced with a curvature wherein the concave portion of the curvature faces the center of the rounded rectangle.

Solid: As used in this disclosure, a solid refers to a state (phase) of matter that: 1) has a fixed volume; and, 2) does not flow.

Sublimation: As used in this disclosure, sublimation refers to a phase transition directly from a solid phase to a gas phase in a manner that bypasses the liquid phase.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A bug repellent system comprising
a housing, a cartridge, and a sublimating device;
wherein the housing contains the cartridge and the sublimating device;
the bug repellent system is configured for use in repelling insects;
wherein the bug repellent system is configured for use with a client;
wherein the bug repellent system is an electrically powered device;
wherein the bug repellent system is worn by the client;
wherein the housing comprises a shell, a clip, a cartridge slot, and a grille;
wherein the clip, the cartridge slot, and the grille are formed in the shell;
wherein the grille is an openwork structure;
wherein the grille holds the solid phase of the cartridge within the cartridge slot;
wherein the grille allows the release of the sublimated pharmacologically active media into the atmosphere.

2. The bug repellent system according to claim 1
wherein the bug repellent system sublimates a pharmacologically active media;
wherein the cartridge contains the pharmacologically active media;
wherein the pharmacologically active media released by the cartridge acts as an insect repellent.

3. The bug repellent system according to claim 2
wherein the cartridge is a chemical device;
wherein the cartridge is a solid phase structure;
wherein the sublimating device sublimates the pharmacologically active media from the cartridge into the atmosphere.

4. The bug repellent system according to claim 3 wherein the sublimating device warms the cartridge such that the pharmacologically active media sublimates into the atmosphere from the cartridge.

5. The bug repellent system according to claim 4
wherein the housing is a casing;
wherein the housing is worn by the client.

6. The bug repellent system according to claim 5
wherein the shell forms the exterior surfaces of the housing;
wherein the shell contains the cartridge and the sublimating device;
wherein the shell is a rectangular block structure.

7. The bug repellent system according to claim 6
wherein the clip is a fastening device;
wherein the clip is a plate structure that attaches to the shell;
wherein the clip forms a spring structure that attaches to a belt of the client.

8. The bug repellent system according to claim 7
wherein the cartridge slot contains the cartridge in the shell;
wherein the cartridge slot is a negative space;
wherein the cartridge slot is sized to receive the cartridge.

9. The bug repellent system according to claim 8 wherein the cartridge slot forms an aperture through the shell.

10. The bug repellent system according to claim 9 wherein the cartridge slot is positioned proximal to the sublimating device such that the sublimating device heats the cartridges contained within the sublimating device.

11. The bug repellent system according to claim 10
wherein the cartridge comprises a paraffin and an essential oil;
wherein the cartridge is a solid phase of a solution comprising the essential oil dissolved in a paraffin solvent;
wherein the essential oil is the pharmacologically active media.

12. The bug repellent system according to claim 11
wherein the essential oil is a lipid-based chemical structure;
wherein the paraffin is a lipid-based chemical structure.

13. The bug repellent system according to claim 12 wherein the essential oil is selected from the group consisting of citronella oil, peppermint oil, lemon oil, *eucalyptus* oil, basil oil, clove oil, thyme oil, lemongrass oil, geranium oil, and lavender oil.

14. The bug repellent system according to claim 13
wherein a power system is an electrochemical device;
wherein the power system converts energy stored as chemical potential energy into electrical energy;
wherein the power system provides the electrical energy required to operate a heating element;
wherein the power system is a regenerative system.

15. The bug repellent system according to claim 14
wherein the sublimating device comprises a heating element, a master switch, and a power system;
wherein the heating element, the master switch, and the power system are electrically interconnected.

16. The bug repellent system according to claim 15
wherein the heating element is an electrical device;
wherein the heating element is a resistive heating device;
wherein the heating element is proximal to the cartridge such that the heat generated by the heating element will accelerate the sublimation of the pharmacologically active media from the cartridge;
wherein the master switch is an electrical switch;
wherein the master switch controls the flow of electricity from the power system into the heating element.

17. The bug repellent system according to claim 16
wherein the power system comprises a battery, a plurality of diodes, a photovoltaic cell, a charging port, and an external power source;
wherein the battery, the plurality of diodes, the photovoltaic cell, the charging port, and the external power source are electrically interconnected;
wherein the external power source further comprises a charging plug;
wherein the battery is further defined with a first positive terminal and a first negative terminal;
wherein the photovoltaic cell is further defined with a second positive terminal and a second negative terminal;
wherein the external power source is further defined with a third positive terminal and a third negative terminal;
wherein each of the plurality of diodes is an electrical device that limits the flow of electrical energy to a single direction;
wherein the plurality of diodes control the flow of electrical energy through the sublimating device;
wherein the plurality of diodes comprises a first diode and a second diode.

18. The bug repellent system according to claim 16
wherein the battery is a rechargeable battery;
wherein the charging port is an electrical circuit that reverses the polarity of the rechargeable battery;
wherein the charging port attaches to an external power source using the charging plug;
wherein the charging port receives electrical energy from the external power source through the charging plug;
wherein the first diode is an electrical device that allows current to flow in only one direction;
wherein the first diode installs between the rechargeable battery and the charging port such that electricity will not flow from the first positive terminal of the rechargeable battery into the second positive terminal of the external power source;
wherein the first diode further installs between the photovoltaic cell and the charging port such that electricity will not flow from the second positive terminal of the photovoltaic cell into the third positive terminal of the external power source;
wherein the photovoltaic cell reverses the polarity of the rechargeable battery and provides the energy necessary to reverse the chemical processes that the rechargeable battery initially used to generate the electrical energy;
wherein the second diode is an electrical device that allows current to flow in only one direction;
wherein the second diode installs between the rechargeable battery and the charging port such that electricity will not flow from the first positive terminal of the rechargeable battery into the second positive terminal of the photovoltaic cell;
wherein the second diode further installs between the photovoltaic cell and the charging port such that electricity will not flow from the third positive terminal of the external power source into the second positive terminal of the photovoltaic cell.

* * * * *